United States Patent Office 3,401,555
Patented Sept. 17, 1968

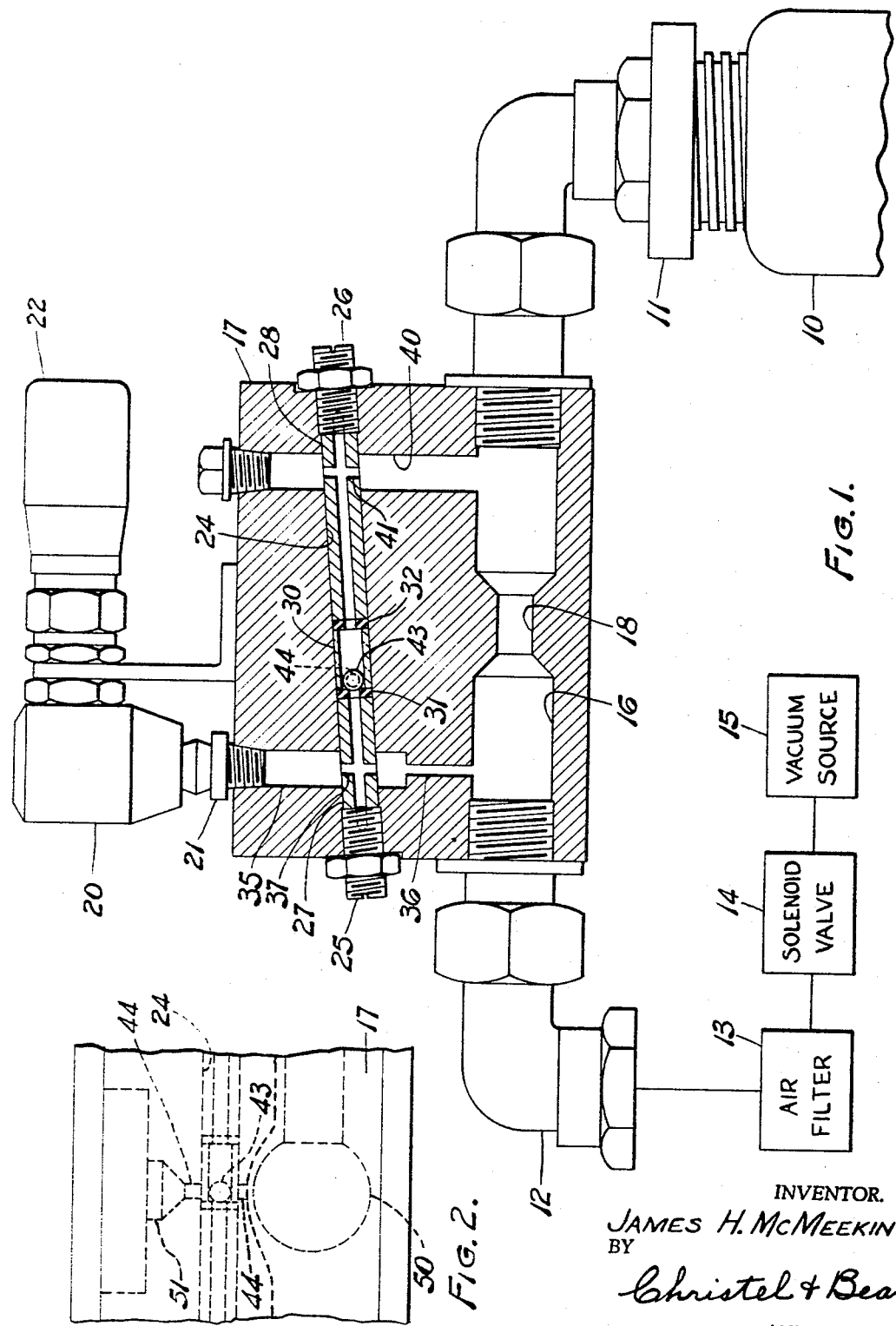

3,401,555
LIGHT-SENSITIVE SYSTEM FOR DETECTING PRESSURE VARIATIONS
James H. McMeekin, Brockway, Pa., assignor to Brockway Glass Company, Inc., Brockway, Pa.
Filed Sept. 16, 1966, Ser. No. 579,974
3 Claims. (Cl. 73—40)

This invention relates to apparatus for sensing variations in pneumatic fluid pressure and more particularly for comparing the same with respect to an adjustable relatively constant pressure to sense variations with respect to such constant pressure. More particularly, the invention relates to a novel transducer arrangement for producing an electric signal upon predetermined variation in the relative values of the variable pressure and the pressure constant.

In a companion application being filed of even date with this application I disclose and claim a pneumatic pressure detection system wherein a sub-atmospheric pressure condition which is subject to variations is balanced against a relatively constant though adjustable sub-atmospheric pressure in such a way that certain undesirable variables, such as variations in the sub-atmospheric supply and various fluid friction effects are nullified. This system is also applicable to super-atmospheric pressure conditions.

According to the system of my aforesaid contemporaneous application, an electrical signal is produced when the pressure being measured or controlled varies from a desired level, such signal being produced by a differential pressure transducer of the differential transformer type wherein the core element of the transformer moves axially in response to differences between the pressure under observation and the aforesaid relatively constant but adjustable reference pressure.

The present invention employs the fundamental principles of the invention of my aforesaid companion application insofar as the pressure comparison portions of the systems are concerned but provides a novel pressure-sensitive transducer system which is relatively simple and inexpensive and avoids the necessity for relatively expensive differential transformer transducers and associated amplifying systems. My present invention may be employed in various pressure variation sensing applications and is particularly useful in a glass container leakage detector of the kind set forth in pending patent application Ser. No. 533,521 filed Mar. 11, 1966, in which I am a co-inventor.

Speaking generally, the transducer system of the present invention provides a member which is movable axially in a pressure duct or chamber in response to differential pressure changes at opposite sides of the member in combination with a light-sensitive means which senses movements of the member to indicate certain pressure differential conditions or relationships and emit an electrical signal in response to such conditions or relationships.

While a single specific embodiment of the principles of the present invention is illustrated in the accompanying drawing and described in detail in the following specification, it is to be understood that such embodiment is by way of example only and that various mechanical modifications may be made without departing from the spirit of the invention, the scope of which is limited only as defined in the appended claims.

In the drawing:
FIG. 1 is a partially schematic side elevational view of a bridge-type flow detector in combination with one form of the optical sensing pressure transducer arrangement of the present invention; and FIG. 2 is a fragmentary top plan view of the structure of FIG. 1.

In the drawing the numeral 10 designates a bottle or jar which is to be tested for leakage and the numeral 11 designates a vacuum plate which engages against the upper surface of the bottle or jar to apply differential fluid pressure to the interior thereof. In the present instance, as in the above-mentioned pending application, the vacuum force which tests the upper surface of the bottle or jar for leakage as between such upper surface and the bottom of vacuum plate 11 may also be employed for lifting the bottle or jar from a conveyor belt or the like to the vacuum plate 11.

The conduit which leads to the vacuum source is designated 12 and as indicated schematically in the drawing, may include an air filter 13 and a solenoid control valve 14 leading to a vacuum source 15. The flow of air from vacuum plate 11 to vacuum conduit 12 is by way of a passage 16 formed in a block 17 which passage contains a flow restriction as indicated at 18 in the drawing.

Since there is a substantial flow of air from the vacuum plate 11 to the vacuum source 15 under leakage conditions, there will be an increase in dynamic fluid pressure to the right of restriction 18 as compared with the dynamic fluid pressure in the conduit 12 and in passage 16 to the left of restriction 18. The means for establishing a bridge-type of pneumatic fluid flow detector will now be described.

In the drawing the numeral 20 designates an adjustable orifice member which admits atmospheric air to a tubular fitting 21, the effective size of the orifice being controlled and regulated by a vernier adjustment member 22. This adjustable orifice assembly is commercially available and the structural details are not important here.

In the drawing the numeral 24 designates a bore which extends through block 17 at an oblique angle as shown in in the drawing and the numerals 25 and 26 designate threaded members which engage in threaded opposite ends of bore 24 and include tubular portions designated 27 and 28, respectively, which extend toward each other in passage 24. A length of glass tubing 30 is interposed between the facing ends of tubular members 27 and 28 and Teflon or other washers 31 and 32 may be interposed between the opposite ends of glass tubing 30 and the tubular members 27 and 28.

The atmospheric air fitting 21 communicates with a bore 35 which intersects bore 24 and extends toward the main vacuum passage 16. Passage 35 contains a restricted portion 36 between bore 24 and the main vacuum passage 16. Tubular member 27 has a transverse opening 37 whereby the pressure of atmospheric air flowing in passage 35 is transmitted through tubular member 27 to the interior of glass tubing 30 at the left-hand end of the latter.

A passage 40 extends from the right-hand end of main vacuum passage 16 to tubular member 28 and a transverse opening 41 in the latter establishes fluid communication between the right-hand end of main vacuum passage 16 and the right-hand edge of glass tubing 30.

From the foregoing it will be seen that the prevailing dynamic fluid pressures upstream of restriction 18 and upstream of restriction 36 are communicated to the opposite ends of glass tubing 30. A ball member 43 contained in glass tubing 30 normally rests at the left-hand end thereof against washer 31 under the force of gravity, assuming equal pressure forces at opposite sides thereof. Other biasing means may be employed, such as a light spring, in which case the bore 24 need not be inclined.

In the illustrated position ball 43 blocks the transmission of light through a passage 44 which extends through block 17. Passage 44 is in registry with ball 43 when ball 43 is in its normal left-hand position. As indicated somewhat schematically in FIG. 2, block 17 is recessed at opposite sides of bore 24 to house a lamp 50 which is located at one end of passage 44 and a light sensitive element 51 at the other end of passage 44. The latter may comprise a commercially available light sensitive semiconductor element known as a silicon photovoltaic readout cell.

The apparatus of the present invention may be arranged to produce a signal when the pressure in the line under control raises to a point where it exceeds the control pressure or when it falls to a point where it is exceeded by the control pressure. For instance, in the inspection of bottles for leakage, a signal may be emitted by the transducer whenever a bad bottle is tested or each time a good bottle is tested. As set up in the drawing herein the transducer is arranged to signal the presence of a bottle which passes inspection.

Accordingly, when a perfect seal occurs as between the top of bottle 10 and a vacuum plate 11, no air will flow in passage 16 and through restriction 18 and the dynamic fluid pressure will thus be the same at both sides of restriction 18. However, since air will flow through atmospheric orifice member 20 and thus through restriction 36, the dynamic pressure in passage 35 above restriction 36 will exceed that in passage 16 and, consequently, will exceed the pressure in passage 40 and in tube 28. Therefore the ball 43 will be moved to the right against the force of gravity, light will pass from lamp 50 to the light sensitive cell 51 through passage 44, and a signal will be produced which may be employed to classify bottle 10 as good and route the same in any desired manner as is well known in the glass container art. The operation will be similar when the seat between bottle 10 and plate 11 is not perfect but the leakage is below a predetermined level.

If bad bottles are to be signaled, the inclination of bore 24 need only be reversed. The present transducer arrangement may be used with equal efficacy with a source of super-atmospheric pressure, in which case air will leak to atmosphere from orifice member 20 and air will be blown into bottle 10 through plate 11.

For various reasons substantial air flow through passage 16 may be desired. For instance, in the aforesaid prior filed copending application the vacuum flow or effect is employed to lift the containers to a vacuum chuck, as well as for inspection. Accordingly, passage 16 may be of substantially greater flow capacity than atmospheric air passage 35 and the restrictions 18 and 36 in these passages will be proportioned accordingly to produce balanced fluid-dynamic forces at opposite sides of ball 43. If desired, the adjustment which is achieved herein by varying the atmospheric orifice of member 20 may be achieved by adjusting restriction 36 or restriction 18.

What is claimed is:
1. A pneumatic leakage testing device comprising a pair of parallel fluid passages each having an end connected to a common source of differential fluid pressure, the opposite end of one of said passages being engageable with means to be tested for leakage, the opposite end of the other of said passages having an orifice leading to atmosphere, flow restrictions in each of said passages, a passage connecting across said fluid passages between the flow restrictions therein and said opposite ends thereof and including a transparent section, a member closely fitting within said section and yieldably biased in one direction, whereby movement of said member in a direction opposite to said one direction occurs in response to a pressure differential in said connecting passage, and a light source and light sensitive means on opposite sides of said transparent section in line with said member in its yieldably biased position for generating a signal in response to said movement.

2. A testing device in accordance with claim 1 wherein said orifice leading to atmosphere is selectively adjustable.

3. A testing device in accordance with claim 1 wherein said differential fluid pressure is subatmospheric.

References Cited
UNITED STATES PATENTS

| | | | |
|---|---|---|---|
| 2,707,879 | 5/1955 | Dwyer | 73—209 |
| 2,808,580 | 10/1957 | Fuller | 73—209 |
| 2,882,520 | 4/1959 | Hass | 250—231 X |
| 2,912,858 | 11/1959 | Fuller | 250—231 X |
| 3,028,750 | 4/1962 | Rondeau | 73—40 |

ROBERT SEGAL, *Primary Examiner.*